INDICATOR SYSTEM
Filed July 30, 1956
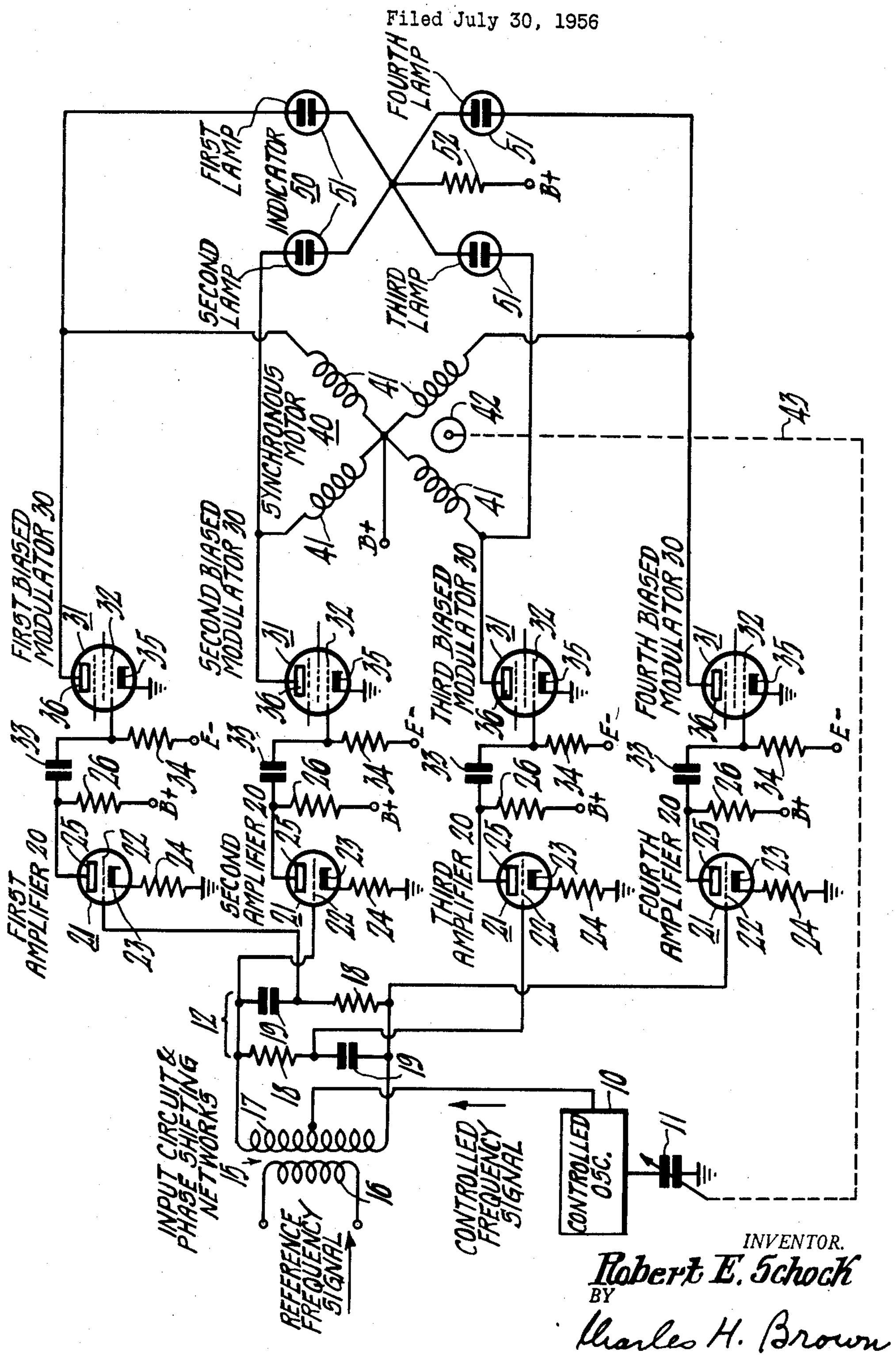
INVENTOR.
Robert E. Schock
BY
Charles H. Brown
ATTORNEY 2,887,678

INDICATOR SYSTEM

Robert E. Schock, Riverhead, N.Y., assignor to Radio Corporation of America, a corporation of Delaware Application July 30, 1956, Serial No. 600,768

4 Claims. (Cl. 340—248)

The invention relates to an indicator system, and particularly to an indicator system for providing, by electrical means, visual indication of the direction and rate of frequency tuning occurring in a comparator type automatic frequency control system.

An object of the invention is to provide an improved indicator system for visually indicating the direction and rate of frequency tuning which takes place in a comparator type automatic frequency control system.

The invention is primarily useful in an automatic frequency control system having a source of controlled frequency signals the frequency of which is to be compared with and controlled as a function of its deviation from the frequency of a source of reference frequency signals. Briefly, the invention comprises a synchronous motor having a plurality of field windings and an armature associated with the field windings. Conventional means are connected between the two signal sources and the field windings for sequentially producing energizing currents in the field windings at a rate and in an order determined by the frequency relation of the signals from the two sources. Means responsive to the rotation of the armature are provided for varying the frequency of the controlled frequency signals. Individual glow discharge devices, each having two electrodes, are connected in parallel with the field windings for visually indicating when each field winding is energized. Thus, the direction and rate of frequency tuning which takes place in the source of controlled frequency signals is visually indicated.

The invention is explained in detail in connection with the accompanying drawing which shows a schematic diagram of one embodiment of the invention. The source of controlled frequency signals may be a conventional oscillator 10 having a variable tuning element, such as a tuning capacitor 11, for changing its frequency. The controlled frequency signal may be compared with a reference frequency signal in any conventional arrangement. The arrangement shown in the drawing comprises an input circuit and two phase shifting networks 12. The input circuit includes a transformer 15 having primary and secondary windings 16, 17 respectively, which are inductively coupled to each other. The reference frequency signal derived from some source, not shown, is applied to the primary winding 16 of the transformer 15, and the controlled frequency signal, derived from the controlled oscillator 10, is applied to the center tap of the secondary winding 17 of the transformer 15. Each of the two phase shifting networks 12 comprises a resistor 18 and a capacitor 19 connected in series between the terminals of the secondary winding 17. The resistor 18 of each phase shifting network 12 is connected at one end to the terminal of the secondary winding 17 to which the capacitor 19 of the other phase shifting network 12 is connected. The signals derived from the phase shifting networks 12 are applied to separate amplifiers 20 which may comprise conventional electron discharge tubes such as the triode vacuum tubes 21 shown. The control grid 22 of the first amplifier tube 21 is connected to the junction of the resistor 18 and capacitor 19 of one phase shifting network 12, and the control grid 22 of the third amplifier tube 21 is connected to the junction of the resistor 18 and capacitor 19 of the other phase shifting network 12. The control grid 22 of the second amplifier tube 21 is connected to one terminal of the secondary winding 17 of the transformer 15, and the control grid 22 of the fourth amplifier tube 21 is connected to the other terminal of the secondary winding 17 of the transformer 15. The cathodes 23 of each of the amplifier tubes 21 are separately connected to a point of reference potential, such as ground, by a cathode resistor 24 to provide proper grid bias voltage for the amplifier tubes 21. The positive terminal of a first source of direct current potential, not shown, is connected at the terminal B+ to each anode 25 of the amplifier tubes 21 by an anode resistor 26. It is to be understood that the negative terminal of the first source of direct current potential is connected to the point of reference potential. While the amplifiers 20 shown comprise triode tubes, other amplifying devices, such as pentode vacuum tubes, could be used in place of the triode tubes.

The signals derived from the amplifiers 20 are applied to separate biased modulators 30. Each of the biased modulators 30 may be a conventional electron discharge device such as the pentode vacuum tubes 31 shown. The control grid 32 of each modulator tube 31 is connected to the anode 25 of its respective amplifier tube 21 by a coupling capacitor 33. The negative terminal of a source of direct current bias potential not shown, is connected at the terminal E— to each control grid 32 of the modulator tubes 31 by a bias resistor 34. It is to be understood that the positive terminal of this same source of bias potential is connected to the point of reference potential. The cathodes 35 of the modulator tubes 31 are connected to the point of reference potential. The bias potential applied to the control grids 32 of the modulator tubes 31 is fixed at a value which renders the modulator tubes 31 normally nonconducting until a predetermined voltage is applied to the control grids 32. Although connections for the other grids of the modulator tubes 31 are not shown, these grids are connected to sources of appropriate potential in the conventional manner. While the biased modulators 30 shown comprise pentode tubes, other amplifying devices, such as triode vacuum tubes, could be used in place of the pentode tubes.

The signals derived from the biased modulators 30 are applied to separate field windings 41 of a conventional synchronous motor 40. The field windings 41 are symmetrically disposed about an armature 42. One terminal of each field winding 41 is connected to the anode 36 of its respective modulator tube 31. The other terminals of the field windings 41 are connected together and connected to the positive terminal B+ of the first source of direct current potential. The armature 42 of the synchronous motor 40 associated with the field windings 41 tends to rotate in accordance with the magnetic fields produced in the field windings 41. This armature 42 is mechanically connected to the tuning capacitor 11 of the controlled oscillator 10 by some means indicated by the dashed line 43 so that as the armature 42 rotates, the tuning capacitor 11 is also rotated. Thus the frequency of the controlled oscillator signals may be varied.

The indicator portion 50 of the system comprises a plurality of glow discharge devices each comprisng an envelope having two electrodes and being filled with a gas. Neon is one gas which is commonly used, and a two electrode glow discharge device which is filled with neon gas is frequently referred to as a neon glow lamp. One electrode of each of the glow lamps 51 is connected to the terminal of the respective field winding 41 which is also connected to the anode 36 of its respective modulator tube 31. The other electrodes of the glow lamps 51 are connected together, and are connected to the positive terminal B+ of the first source of direct current potential through a voltage dropping resistor 52. Thus, each of the glow lamps 51 is effectively connected in parallel with its associated field winding 41. This voltage dropping resistor 52 is of such a magnitude that if more than one glow lamp 51 draws current at any one time, the voltage drop across the resistor 52 will then be sufficient to reduce the potential across all of the glow lamps 51 below the potential required to maintain the glow lamps 51 ignited. This arrangement ensures that only one of the glow lamps 51 is ignited at any one time.

With the system in operation, the phase shifting networks 12 cause the reference frequency signal to appear at the control grids 22 of the amplifier tubes 21 in an advancing phase quadrature sequence. However, the controlled frequency signal appears at each of the control grids 22 of the amplifier tubes 21 in the same phase. For the purposes of describing the system, it is assumed that the reference frequency signal and the controlled frequency signal have the same frequency and are in phase agreement. It is also assumed that the reference frequency signal is in phase with the controlled frequency signal at the control grid 22 of the first amplifier tube 21. Since the reference frequency signal at the control grid 22 of the second amplifier tube 21 is shifted ninety degrees, it is ninety degrees out of phase with the controlled frequency signal at the control grid 22 of the second amplifier tube 21. Likewise, the reference frequency signal is one hundred and eighty degrees out of phase with the controlled frequency signal at the control grid 22 of the third amplifier tube 21, and two hundred and seventy degrees out of phase with the controlled frequency signal at the control grid 22 of the fourth amplifier tube 21. With the system in the condition just described, the resultant voltage at the control grid 22 of the first amplifier tube 21 represents the vectorial sum of the two in-phase voltages. Likewise, the voltage at the control grid 22 of the second amplifier tube 21 represents the vectorial sum of the two voltages which are ninety degrees out of phase, the voltage at the control grid 22 of the third amplifier tube 21 represents the vectorial sum of the two voltages which are one hundred and eighty degrees out of phase, and the voltage at the control grid 22 of the fourth amplifier tube 21 is the vectorial sum of the two voltages which are two hundred and seventy degrees out of phase. When the system is in this condition, only the voltage at the control grid 32 of the first modulator tube 31 is sufficient to overcome the bias potential so that only the first modulator tube 31 conducts. Thus only the first field winding 41 associated with the first modulator 30 is energized. Consequently, the armature 42 rotates to conform with the magnetic field set up by the first field winding 41 and then remains stationary. The first glow lamp 51 associated with the first field winding 41 is ignited and remains ignited, while the other glow lamps 51 are extinguished. However, if the reference frequency signal and the controlled frequency signal have frequencies which differ by some amount, the voltages at the control grids 22 of the amplifier tubes 21 rise and fall sequentially in an order which depends upon whether the controlled frequency signal has a frequency higher or lower than the frequency of the reference frequency signal. Thus, the amplifiers 20 conduct in a sequential order, and this in turn causes the biased modulators 30 to conduct in the same sequential order. The sequential conduction of the biased modulators 30 causes the same sequential energization of the field windings 41. The armature 42 follows the magnetic fields set up by the energizations of the field windings 41 and rotates the tuning capacitor 11 in a direction which tends to correct the frequency of the controlled oscillator 10 so that it has the same frequency as, and is in phase with, the frequency of the reference frequency signal. At the same time, the glow lamps 51 are lighted sequentially in the same order as their respective field windings 41, and if the glow lamps 51 are equally spaced around the circumference of a circle, the sequential lighting of the glow lamps 51 gives a visual indication of the tuning taking place in the controlled oscillator 10. If the glow lamps 51 are sequentially lighted in a clockwise order, this indicates that the tuning capacitor 11 is being varied in one direction, while if the glow lamps 51 are sequentially lighted in a counterclockwise order, this indicates that the tuning capacitor 11 is being varied in the opposite direction. The rate at which the glow lamps 51 are lighted indicates the difference in frequency between the reference frequency signal and the controlled frequency signal. A zero rate (i.e. one glow lamp 51 remains lighted) indicates that there is zero frequency difference.

The indicator system described is particularly useful in communications receivers in which the frequency of a local oscillator (corresponding to the controlled oscillator) is to be compared and synchronized with an incoming carrier signal (corresponding to the reference frequency signal). The indicator system provides, at any desired location, a visual indication of the frequency tuning within the receiver by electrical means. This feature is advantageous over the indicator systems which use mechanically operated indicators that are mechanically connected to the motor armature or the drive mechanism. Such mechanically operated indicators are not always adaptable to provide visual indication on the front panel of a receiver or at some other remote location. However, with the indicator system according to the invention, the motor and tuning capacitor may be placed at any convenient location, and the indicator lamps may be placed at any remote location, such as the front panel of a receiver positioned some distance from the motor and tuning capacitor.

The invention claimed is:

1. An automatic frequency control system comprising a source of reference frequency signals, a source of controlled frequency signals including variable means for controlling the frequency of said controlled frequency signals, a synchronous motor having four field windings and an armature associated with said field windings that is responsive to magnetic fields produced by current flow through said field windings, said field windings being symmetrically disposed about said armature and having one end of each of said field windings connected to a common terminal, means for applying direct current to said common terminal, means connected between said sources and the other ends of said field windings for sequentially permitting energizing currents to flow through said field windings at a rate and in an order determined by the frequency relation of the signals produced by said sources, means connected between said armature and said variable means for operating said variable means in response to the rotation of said armature, four neon glow lamps each having one electrode connected to a common terminal and each having a second electrode connected to a separate one of said other ends of said field windings, and a voltage dropping resistor connected between said common terminal of said glow lamps and said common terminal of said field windings.

2. An automatic frequency control system as described in claim 1, wherein said voltage dropping resistor has a value such that if more than one of said glow lamps draws current at any one time, the voltage drop across said voltage dropping resistor will reduce the potential applied to all of said glow lamps below the ignition potential.

3. An automatic frequency control system comprising a source of reference frequency signals, a source of controlled frequency signals including variable means for controlling the frequency of said controlled frequency signals, a synchronous motor having a plurality of field windings and an armature associated with said field windings that is responsible to magnetic fields produced by current flow through said field windings, said field windings being symmetrically disposed about said armature and having one end of each of said field windings connected to a common terminal, means for applying direct current to said common terminal, means connected between said sources and the other ends of said field windings for sequentially permitting energizing currents to flow through said field windings at a rate and in an order determined by the frequency relation of the signals produced by said sources, means connected between said armature and said variable means for operating said variable means in response to the rotation of said armature, a plurality of neon glow lamps of the same number as said plurality of said windings, each glow lamp having one electrode connected to a common terminal and each having a second electrode connected to a separate one of said other ends of said field windings, and a voltage dropping element connected between said common terminal of said glow lamps and said common terminal of said field windings.

4. An automatic frequency control system as claimed in claim 3 and wherein said neon-glow lamps are positioned in relation to one another according to the order in which said field windings are energized, said lamps being lighted in an order and at a rate according to the order and rate in which said windings are energized by said energizing currents.

References Cited in the file of this patent

UNITED STATES PATENTS

| | | |
|---|---|---|
| 1,813,929 | Hough | July 14, 1931 |
| 2,176,742 | La Pierre | Oct. 17, 1939 |
| 2,424,843 | Owsley | July 29, 1947 |
| 2,499,116 | Simons | Feb. 28, 1950 |
| 2,532,435 | Allen | Dec. 5, 1950 |
| 2,619,542 | Carver | Nov. 25, 1952 |
| 2,719,186 | Lulofs | Sept. 27, 1955 |
| 2,758,278 | Adams | Aug. 7, 1956 |